Sept. 18, 1923.　　　　　　　　　　　　　　1,468,563
L. R. GIRARD
CONFECTION CONE TRAY
Filed Aug. 4, 1922
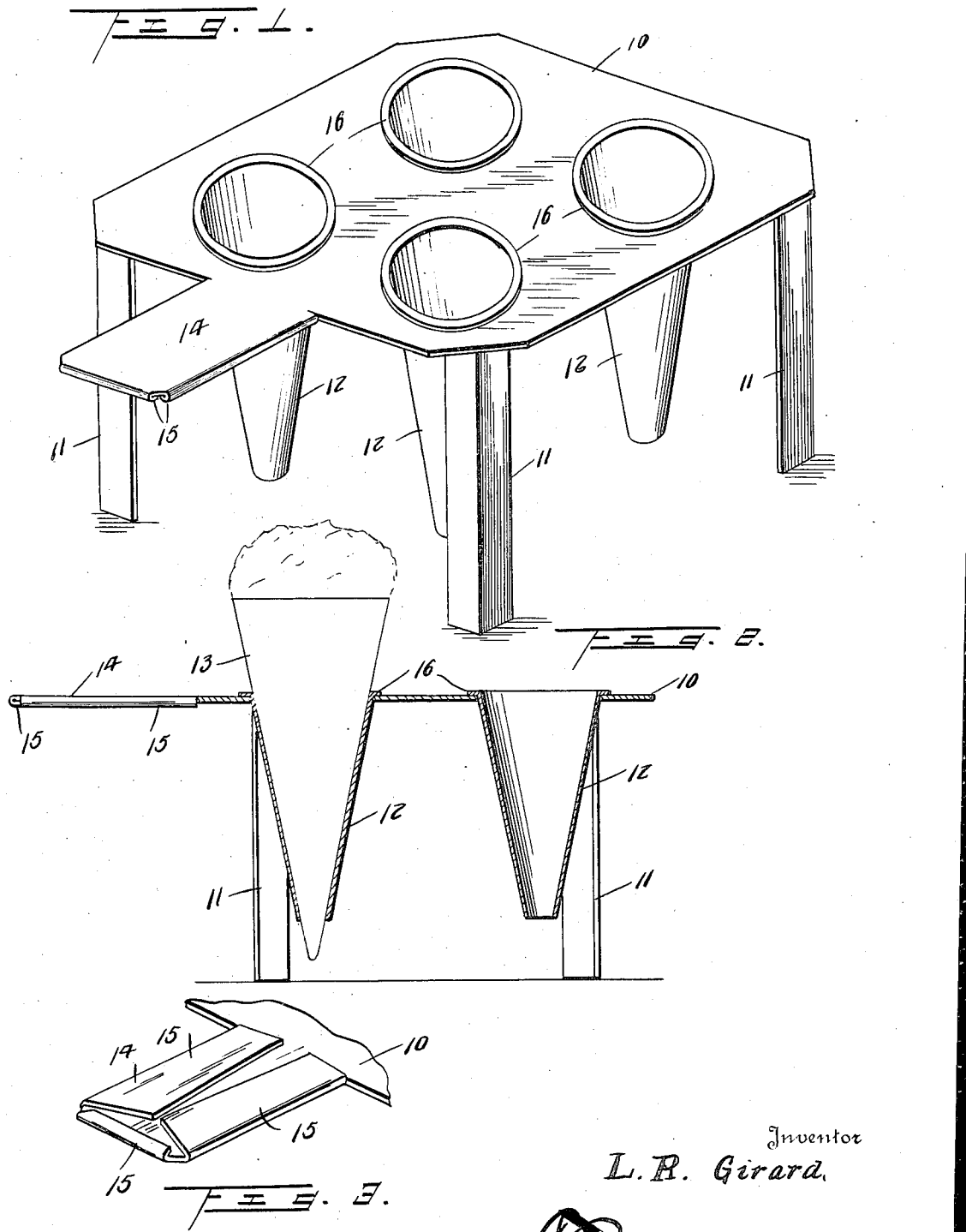

Patented Sept. 18, 1923.

1,468,563

UNITED STATES PATENT OFFICE.

LOUIS R. GIRARD, OF FALL RIVER, WISCONSIN.

CONFECTION CONE TRAY.

Application filed August 4, 1922. Serial No. 579,665.

*To all whom it may concern:*

Be it known that I, LOUIS R. GIRARD, a citizen of the United States, residing at Fall River, in the county of Columbia and State of Wisconsin, have invented certain new and useful Improvements in a Confection Cone Tray; and I do hereby declare the following to be a full, clear, and exact description of the invention, such as will enable others skilled in the art to which it appertains to make and use the same.

This invention relates to a confection cone tray.

It particularly aims to provide a novel means whereby less handling of a cake cone containing ice cream or the equivalent, incidental to sale, is required, and particularly means whereby the cones do not have to be held in the hand while filling same with ice cream, while changing money, or at the same time as money for their purchase. As a result, such cones may be vended in a more sanitary manner.

It is further aimed to provide a construction wherein the cones will be supported at a distance from the line of support or engagement of legs of the tray with a counter or the like in which the cones will project above the tray so that the latter does not have to be engaged incidental to removal of the cones and with the tray having a handle to enable it to be readily moved while filled with cones.

Servient objects and advantages will become apparent from a consideration of the description following taken in connection with accompanying drawings illustrating one practical embodiment.

In said drawings:—

Figure 1 is a perspective view of the tray;

Figure 2 is a longitudinal sectional view taken on the line 2—2 of Figure 1 passing centrally through one row of trays and showing a cone in place; and Figure 3 is an inverted perspective view of the handle.

Like reference characters designate like or similar parts in the different views.

In reducing the invention to practice, a plate is provided at 10 of any suitable size and configuration, adapted to be supported upon a counter or otherwise by means of legs 11, depending from the plate and being of any suitable configuration and size.

Depending from the plate 10 are any suitable number of holders 12, primarily adapted to retain cake cones such as at 13 and which are to be filled with a confection such as ice cream. It will be noted that the supported cones extend a distance above the plate 10.

A suitable handle 14 extends from the plate 10, being for instance integral therewith and having reinforcing flanges 15 at its sides and clinched against its under surface.

All of the parts may be made from metal or any other suitable material. Preferably the same are made from aluminum so as to be extremely light in weight.

The holders 12 are preferably conical in shape, open at their lower ends, which are disposed at a higher level than the bases of the legs and they preferably have outwardly extending flanges 16 at their top which overlap and support the same on the plate 10. As the holders 12 are open at their lower ends, they may be readily cleaned, and the device as a result maintained strictly sanitary.

While I have shown in the drawings one row of holders three in number and another row two in number, yet a limitation to such numbers is not to be inferred since the same may obviously be varied according to conditions.

As a result of the construction described, the cake cones 13 prior to filling may be placed in the holders 12. As the ice cream or confection is dipped, the same is deposited in the cones, and thus the cones do not have to be held by the vendor. Also, the vendor's hands are free to receive money and to change the same, avoiding contact of the money with the cones and possible spread of disease as a result. When the cone has been paid for and change of money made, when necessary, the purchaser grasps the cone at the portion projecting above the plate 10 and removes it for consumption. It will thus be seen that the vending of the cones or confections of the character specified may be accomplished in a more sanitary manner than is at present in vogue.

As merely one practical embodiment has been illustrated and described, it is to be understood that changes in the details thereof may be resorted to provided they fall within the spirit and scope of the invention.

I claim as my invention:—

A tray for the sanitary handling of confections of the class described consisting of a metallic plate provided with openings therethrough, holders depending from the plate and snugly fitting said openings, lateral flanges at the upper edges of the holders resting on the plate about said openings, legs depending from the plate and depending below the holders, a handle integral with and extending from the plate, reinforcing flanges integral with the handle and secured against the under side thereof, each holder being open at both ends and adapted to receive a confection of greater length than itself whereby the confection will extend above the plate for grasping.

In testimony whereof I affix my signature in presence of two witnesses.

LOUIS R. GIRARD.

Witnesses:
A. FREDERICK,
ALICE C. BROSSARD.